United States Patent

[11] 3,622,652

[72] Inventors Parviz Hamed
Cuyahoga Falls;
Everett T. McDonel, Brecksville, both of Ohio
[21] Appl. No. 691,718
[22] Filed Dec. 19, 1967
[45] Patented Nov. 23, 1971
[73] Assignee The B. F. Goodrich Company
New York, N.Y.
Continuation-in-part of application Ser. No. 491,409, Sept. 29, 1965, now abandoned. This application Dec. 19, 1967, Ser. No. 691,718

[54] EPDM POLYMERS MODIFIED BY GRAFT POLYMERIZATION
1 Claim, No Drawings

[52] U.S. Cl. .................................................. 260/878 R, 260/23.7 M, 260/41.5 R
[51] Int. Cl. .................................................. C08f 1/04, C08f 15/00
[50] Field of Search ........................................ 260/878

[56] References Cited
UNITED STATES PATENTS

| | | | |
|---|---|---|---|
| 3,271,477 | 9/1966 | Kresge ........................... | 260/877 |
| 3,312,757 | 4/1967 | McRitchie ...................... | 260/878 |
| 3,344,105 | 9/1967 | McDonel et al. .............. | 260/33.6 |
| 3,435,096 | 3/1969 | Limbert et al. ................ | 260/878 |

*Primary Examiner*—Joseph L. Schofer
*Assistant Examiner*—Stanford M. Levin
*Attorney*—Albert C. Doxsey

ABSTRACT: Alkyl acrylates and methacrylates are graft polymerized onto ethylene-propylene-diene rubbery elastomers as a backbone. The graft polymers are sulfur curable and have superior abrasion resistance compared to nongrafted ethylene-propylene-diene elastomers.

EPDM POLYMERS MODIFIED BY GRAFT POLYMERIZATION

CROSS-REFERENCE TO RELATED APPLICATIONS

Ser. No. 491,409 filed Sept. 29, 1965, and now abandoned of which this application is a continuation-in-part.

BACKGROUND OF THE INVENTION

Any synthetic elastomer is of interest to the manufacturer of molded, extruded and cast articles made traditionally from natural rubber or any of the synthetic substitutes and alternative materials for natural rubber which have been developed in recent years. Elastomers currently receiving much attention, particularly because of their potential low cost and high resistance to weather, age, heat and ozone, are copolymers of ethylene and propylene and the terpolymers of ethylene-propylene and a straight chain or cyclic diolefinic material, the manufacture of which is disclosed in U.S. Pat. Nos. including 2,933,480, 3,000,866 and 3,000,867. These ethylene-propylene-diene terpolymers are currently identified as EPDM rubbers in the ASTM designation D1418–56T and ethylene-propylene copolymers ad designated as EPM rubbers. The major difference between the two types of materials is that EPM rubbers are cured in a peroxide cure system. They are so completely unsaturated that a sulfur cure is not possible. EPDM rubbers; containing some unsaturation in the diene component present, do undergo sulfur cure. A major deficiency of EPDM rubbers, in the eyes of the rubber industry is their poor abrasion resistance in comparison to a styrene-butadiene rubber (SBR), cis-polybutadiene rubber (CB) blend.

To become a major item in the present day synthetic rubber industry, a material must lend itself to the manufacture of shaped articles such as tubing, belts, and the major product, pneumatic tires. If a new material is low enough in cost and has sufficiently outstanding properties, the industry will make every effort to use it in spite of deficiencies that make it more difficult to employ than the favorite natural rubber (NR). Other synthetic materials, including styrene-butadiene rubber (SBR), and butyl rubber (IIR) have presented similar problems and achieved industry and consumer acceptance. Tires, belts, and tubing are all required to possess a high degree of abrasion resistance.

SUMMARY OF THE INVENTION

Abrasion resistance of EPM and EPDM polymers can be substantially improved by grafting on to these polymers as backbones, side chain polymers comprising units formed by the graft polymerization of alkyl acrylic monomers. The favored acrylic monomers are those of the formula

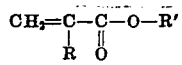

where R is selected from the class consisting of hydrogen and methyl radicals and R' is selected from alkyl radicals having one to 10 carbon atoms and hydrogen, and the monomers include ethyl acrylate, butyl acrylate, octyl acrylate, decyl acrylate, acrylic acid and acrylic acid anhydride as well as the corresponding methacrylic acid, alkyl methacrylates and the anhydrides of methacrylic acid. The acrylic monomer is preferably employed in amounts of 1 to 6 percent by weight of backbone polymer.

Various polymers and elastomers, including natural rubber and styrene-butadiene rubber, have been modified by graft polymerization (the polymerization of one or more monomers in the presence of an already formed polymer whereby the newly polymerized monomers take up branch or side chain positions on the preformed backbone polymer) in solution. In general this technique has not resulted in improvement of properties over those exhibited by the backbone polymer alone.

In the practice of this invention, the backbone polymer, graft monomers and the catalysts are mixed in an inert atmosphere and the reaction results in favorable modification of the backbone polymer. This type of modification of EPDM terpolymer by acrylic acid and ester monomers produces a product with improved raw or green strength and improved abrasion resistance.

The available commercial EPDM terpolymers have 50 to 70 mol percent ethylene, 1 to 3 mol percent diene and dilute solution viscosity (DSV) measured by dissolving 0.2 g. in 100 ml. toluene of 1.4 to 2.5. They are readily produced by the processes shown in the patents listed above.

The mixing of the solid components in the practice of this invention is best done in an inert atmosphere and should be extremely thorough. A sealed Banbury machine is an ideal mixing device.

The solid free radical catalysts employed to initiate the polymerization of the acrylic monomer include organic hydroperoxides, cumene hydroperoxide, paramenthane hydroperoxide, diisopropyl benzene hydroperoxide or any solid organic hydroperoxide that decomposes to initiate free-radical reactions. Catalyst is usually used in amounts equal to 0.5 to 0.7 percent by weight of polymerizable acrylic monomers.

Activators for the polymerization include oil-soluble ferrous soaps, water-soluble sulfoxylates, reducing sugar and complexed iron salts. Typical materials used include sodium formaldehyde sulfoxylate, sodium benzaldehyde sulfoxylate, monosodium ferric ethylenediamine tetraacetate, tetrasodium ethylenediamine tetraacetate, 90 percent tetrasodium ethylenediamine tetraacetate, 10 percent dihydroxyethylglycine, and equimolar trisodium hydroxyethylethylene diamine triacetate and sodium gluconate. Activators are used in amounts of 0.02 to 0.03 percent by weight actual iron based on polymerizable acrylic monomers.

Briefly, an EPDM terpolymer is placed in a preheated Banbury mixer containing a nitrogen atmosphere blanket. An acrylic monomer, organic hydroperoxide catalyst and activator are added. A mixing time of 10 and 30 minutes at temperatures of 300° to 350° F. is usually sufficient. The graft polymer is ready for use with no further treatment when the mixer is emptied. The Pico Abrasion Tester and its use are described in U.S. Pat. No. 2,799,155.

It is believed that in the absence of oxygen the hydroperoxide catalyst decomposes to radicals which extract hydrogen from the EPDM polymer chains. The polymer radicals thus formed catalyze the addition of acrylate monomers to the EPDM backbone chain, forming graft polymer. The fairly high temperatures employed serve to shorten, modify, or control the length of the grafted acrylate side chains.

DETAILED DESCRIPTION OF THE INVENTION

Examples 1–3

An EPDM terpolymer, 65 mol percent ethylene, 1.5 mol percent diene, DSV 2.3, is charged to a Banbury mixer heated to 300° F. and containing a nitrogen atmosphere. Acrylic monomer, catalyst and activator are added and the batch is mixed for 15 min. at 320° F.

| Material | Parts | | |
|---|---|---|---|
| | 1 | 2 | 3 |
| EPDM terpolymer | 100 | 100 | 100 |
| Methacrylic acid | 3 | – | – |
| Methamethacrylate | – | 1.5 | 3 |
| Monosodium ferric ethylenediamine | 0.0004 | 0.0002 | 0.0004 |
| p-Menthane hydroperoxide | 0.012 | 0.006 | 0.012 |

The three graft polymers are evaluated by compounding, curing and testing as follows:

TABLE 1

| Recipe | Control | 1 | 2 | 3 |
|---|---|---|---|---|
| EPDM terpolymer | 100 | | | |
| Grafted EPDM terpolymer | | 100 | 100 | 100 |
| Carbon black | 85 | 85 | 85 | 85 |
| Zinc oxide | 5 | 5 | 5 | 5 |
| Stearic acid | 1 | 1 | 1 | 1 |
| Naphthenic process oil | 50 | 50 | 50 | 50 |
| Tetramethylthiuram disulfide | 1.0 | 1.0 | 1.0 | 1.0 |
| Benzothiazyl disulfide | 0.5 | 0.5 | 0.5 | 0.5 |
| Sulfur | 1.25 | 1.25 | 1.25 | 1.25 |
| Cure 60' at 302° F.: | | | | |
| Tensile, p.s.i | 3,000 | 2,900 | 2,950 | 2,820 |
| Elongation, percent | 500 | 440 | 420 | 400 |
| 300% modulus, p.s.i | 1,450 | 1,760 | 1,850 | 1,930 |
| Pico abrasion | 106 | 138 | 138 | 138 |
| Hardness, Shore A | 58 | 60 | 62 | 63 |
| Belt flex crack growth resistance—3 pounds load, 70° C., initial cut 0.80: | | | | |
| 8 hours crack growth | 1.34 | 0.97 | .92 | .99 |
| 16 hours crack growth | 3.47 | 2.84 | 2.54 | 2.30 |

The test data indicate that the graft modification of the EPDM polymer with various acrylic monomers has a completely unexpected effect of greatly increasing the abrasion resistance of the parent stock. Physical properties such as tensile and elongation are not impaired by the graft polymerization. Crack growth resistance, another important property of tire stocks is enchanced significantly over the control.

Mooney scorch values, compression set, permanent set and hysteresis properties remain equivalent to those of the control.

EXAMPLES 4–8

The EPDM terpolymer of example 1 is mixed with a range of amounts of methamethacrylate and free radical generating catalyst in a Banbury mixer heated to 300° F. and containing a nitrogen atmosphere. The batches are mixed for 10 minutes at 320° F.

| | Control | 4 | 5 | 6 | 7 | 8 |
|---|---|---|---|---|---|---|
| EPBM terpolymer | 100 | 100 | 100 | 100 | 100 | 100 |
| Methamethacrylate | | 1.5 | 3.0 | 6.0 | 10.0 | 14.0 |
| t-Butyl hydroperoxide | | 0.15 | 0.3 | 0.6 | 1.0 | 194 |

The prepared graft polymers are formulated into a tread stock recipe, cured and tested as shown in Table 2.

These five graft polymers are evaluated against a control stock by compounding, curing and testing as follows:

TABLE 2

| | Control | 4 | 5 | 6 | 7 | 8 |
|---|---|---|---|---|---|---|
| Control (no graft) | 100 | | | | | |
| #4 (1.5 graft) | | 100 | | | | |
| #5 (3.0 graft) | | | 1.00 | | | |
| #6 (6.0 graft) | | | | 100 | | |
| #7 (10.0 graft) | | | | | 100 | |
| #8 (14.0 graft) | | | | | | 100 |
| Carbon black | 85 | 85 | 85 | 85 | 85 | 85 |
| Zinc oxide | 5 | 5 | 5 | 5 | 5 | 5 |
| Stearic acid | 1 | 1 | 1 | 1 | 1 | 1 |
| Naphthenic process oil | 50 | 50 | 50 | 05 | 50 | 50 |
| Tetramethyl thiuram disulfide | 1.0 | 1.0 | 1.0 | 1.0 | 1.0 | 1.0 |
| Mercaptobenzothiazole | 0.5 | 0.5 | 0.5 | 0.5 | 0.5 | 0.5 |
| Sulfur | 1.25 | 1.25 | 1.25 | 1.25 | 1.25 | 1.25 |

The six batches are cured for 60 minutes at 302° F. and tested with the following results:

| | Control | 4 | 5 | 6 | 7 | 8 |
|---|---|---|---|---|---|---|
| Tensile, p.s.i | 3,000 | 2,850 | 3,000 | 2,900 | 2,750 | 2,800 |
| Elongation, percent | 470 | 460 | 480 | 440 | 450 | 430 |
| 300% Modulus, p.s.i | 1,500 | 1,650 | 1,650 | 1,700 | 1,600 | 1,600 |
| Pico abrasion | 136 | 153 | 157 | 149 | 143 | 141 |
| Belt flex crack growth resistance (3 lbs. load, 70° C., initial cut 0.80): | | | | | | |
| 8 hours | 2.13 | 1.39 | 1.34 | 1.33 | 1.41 | 1.39 |
| 16 hours | 6.70 | 2.40 | 2.50 | 3.23 | 2.20 | 4.41 |

Study of these date indicates that graft polymerization of an acrylate monomer onto an ethylene-propylenediene terpolymer in a Banbury mixer, free-radical catalyzed and under an inert atmosphere, forms graft polymers, which, when compounded in tire tread stocks show improvement over a control stock in both Pico Abrasion and Belt Flex Crack Growth, two properties closely allied to successful tire performance, in inverse proportion to the amount of acrylate polymer present and that for best performance in a tire tread stock the range of added acrylic monomer should be 1.5 to 6.0 parts per 100 parts of ethylene-propylene rubber.

We claim:

1. The method of preparing sulfur-curable graft polymers on ethylene-propylene-diene polymers as backbone polymer of from 1.0 to 6.0 percent by weight of said backbone polymer of a material of the formula

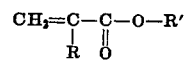

where R is selected from the class consisting of hydrogen and methyl radicals and R' is selected from the class consisting of alkyl radicals having one to 10 carbon atoms and anhydrides of acrylic acid and methacrylic acid, comprising heating said backbone polymer and said material in the solid state at 300°–350° F. in an inert atmosphere in the absence of any solvent or inert diluent and in the additional presence of only a free-radical generating catalyst while mixing said polymer and said material for 10–30 minutes, said graft polymer when sulfur-cured, being characterized by superior abrasion resistance as compared to ungrafted sulfur-cured ethylene-propylene-diene polymers.

* * * * *

UNITED STATES PATENT OFFICE
CERTIFICATE OF CORRECTION

Patent No. 3,622,652          Dated November 23, 1971

Inventor(s) Everett T. McDonel and Parviz Hamed

It is certified that error appears in the above-identified patent and that said Letters Patent are hereby corrected as shown below:

Column 1, line 23, "ad" should read ---are---. Column 3, line 24, "enchanced" should read ---enhanced---. Column 3, line 36, "EPBM" should read ---EPDM---. Column 3, line 38, "194" should read ---1.4---. Column 3, line 48, "1.00" should read ---100---. Column 3, line 53, "05" should read ---50---. Column 4, line 14, "2.20" should read ----4.20----.

Signed and sealed this 9th day of May 1972.

(SEAL)
Attest:

EDWARD M. FLETCHER, JR.　　　　　　　ROBERT GOTTSCHALK
Attesting Officer　　　　　　　　　　　Commissioner of Patents